US010766020B2

(12) United States Patent
Wei et al.

(10) Patent No.: US 10,766,020 B2
(45) Date of Patent: Sep. 8, 2020

(54) PLATINUM-CONTAINING CATALYSTS FOR COMBUSTION ENGINES

(71) Applicant: BASF Corporation, Florham Park, NJ (US)

(72) Inventors: Xinyi Wei, Princeton, NJ (US); Stanley A. Roth, Yardley, PA (US); Haiyang Zhu, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/555,233

(22) PCT Filed: Mar. 3, 2016

(86) PCT No.: PCT/US2016/020668
§ 371 (c)(1),
(2) Date: Sep. 1, 2017

(87) PCT Pub. No.: WO2016/141176
PCT Pub. Date: Sep. 9, 2016

(65) Prior Publication Data
US 2018/0036716 A1 Feb. 8, 2018

Related U.S. Application Data

(60) Provisional application No. 62/128,801, filed on Mar. 5, 2015.

(51) Int. Cl.
*B01J 23/42* (2006.01)
*B01J 23/44* (2006.01)
(Continued)

(52) U.S. Cl.
CPC ............ *B01J 23/42* (2013.01); *B01D 53/944* (2013.01); *B01J 23/44* (2013.01); *B01J 35/002* (2013.01);
(Continued)

(58) Field of Classification Search
CPC . B01J 23/42; B01J 23/44; B01J 35/002; B01J 35/006; B01J 35/04; B01J 37/0036; B01J 37/0215; B01J 37/10; B01D 53/944
See application file for complete search history.

(56) References Cited

U.S. PATENT DOCUMENTS 8,066,963 B2 * 11/2011 Klingmann .......... B01D 53/944
423/213.5
8,080,495 B2 * 12/2011 Oljaca ................. B01D 53/944
420/465
(Continued)

FOREIGN PATENT DOCUMENTS

GB 799 459 8/1958
WO WO2014117162 7/2014

OTHER PUBLICATIONS

Matam et al., "The Impact of Aging Environment on the Evolution of Al2O3 Supported Pt Nanoparticles and their NO Oxidation Activity" *Applied Catalysis B. Environmental*, 2013, pp. 214-224, vol. 129.
(Continued)

*Primary Examiner* — Cam N. Nguyen
(74) *Attorney, Agent, or Firm* — Womble Bond Dickinson (US) LLP

(57) ABSTRACT

Emissions treatment systems of combustion engines are provided, which comprise a platinum-containing catalyst that is degreened during production, which is before exposure to operating conditions of a vehicle having a diesel engine. The platinum-containing catalyst, in the form of a platinum component on a high surface area refractory metal oxide support, exhibits a vibration frequency of about 2085 to about 2105 cm−1 as measured by CO-DRIFTS. Such catalytic material is essentially-free of platinum oxide species found at greater than about 2110 cm−1 as measured by
(Continued)

CO-DRIFTS. Such catalysts can provide excellent and consistent conversion of nitrogen oxide (NO) to nitrogen dioxide (NO2).

10 Claims, 10 Drawing Sheets

(51) Int. Cl.
*B01J 35/00* (2006.01)
*B01J 35/04* (2006.01)
*B01J 37/00* (2006.01)
*B01J 37/02* (2006.01)
*B01J 37/10* (2006.01)
*B01D 53/94* (2006.01)
*F01N 3/035* (2006.01)
*F01N 3/10* (2006.01)

(52) U.S. Cl.
CPC ............ *B01J 35/006* (2013.01); *B01J 35/04* (2013.01); *B01J 37/0036* (2013.01); *B01J 37/0215* (2013.01); *B01J 37/10* (2013.01); *F01N 3/035* (2013.01); *F01N 3/103* (2013.01); *B01D 2255/1021* (2013.01); *B01D 2255/1023* (2013.01); *B01D 2255/9202* (2013.01); *B01D 2258/012* (2013.01); *F01N 2370/02* (2013.01); *Y02A 50/2322* (2018.01)

(56) References Cited

U.S. PATENT DOCUMENTS

| | | | |
|---|---|---|---|
| 8,640,440 B2 * | 2/2014 | Klingmann | B01D 53/944 60/274 |
| 9,427,732 B2 * | 8/2016 | Yin | B01J 35/0006 |
| 9,517,448 B2 * | 12/2016 | Kearl | B01D 53/9422 |
| 9,566,568 B2 * | 2/2017 | Yin | B01J 35/0006 |
| 9,687,811 B2 * | 6/2017 | Biberger | B01J 20/02 |
| 2010/0290964 A1 | 11/2010 | Southward et al. | |
| 2012/0060472 A1 | 3/2012 | Li et al. | |
| 2012/0107188 A1 | 5/2012 | Watanabe et al. | |
| 2014/0038814 A1 | 2/2014 | David et al. | |
| 2014/0271427 A1 | 9/2014 | Hoke et al. | |

OTHER PUBLICATIONS

Shen et al., "Study of Pt Dispersion on Ce Based Supports and the Influence on the CO Oxidation Reaction" *Chemical Engineering Journal*, 2014, pp. 40-48, vol. 255.

* cited by examiner

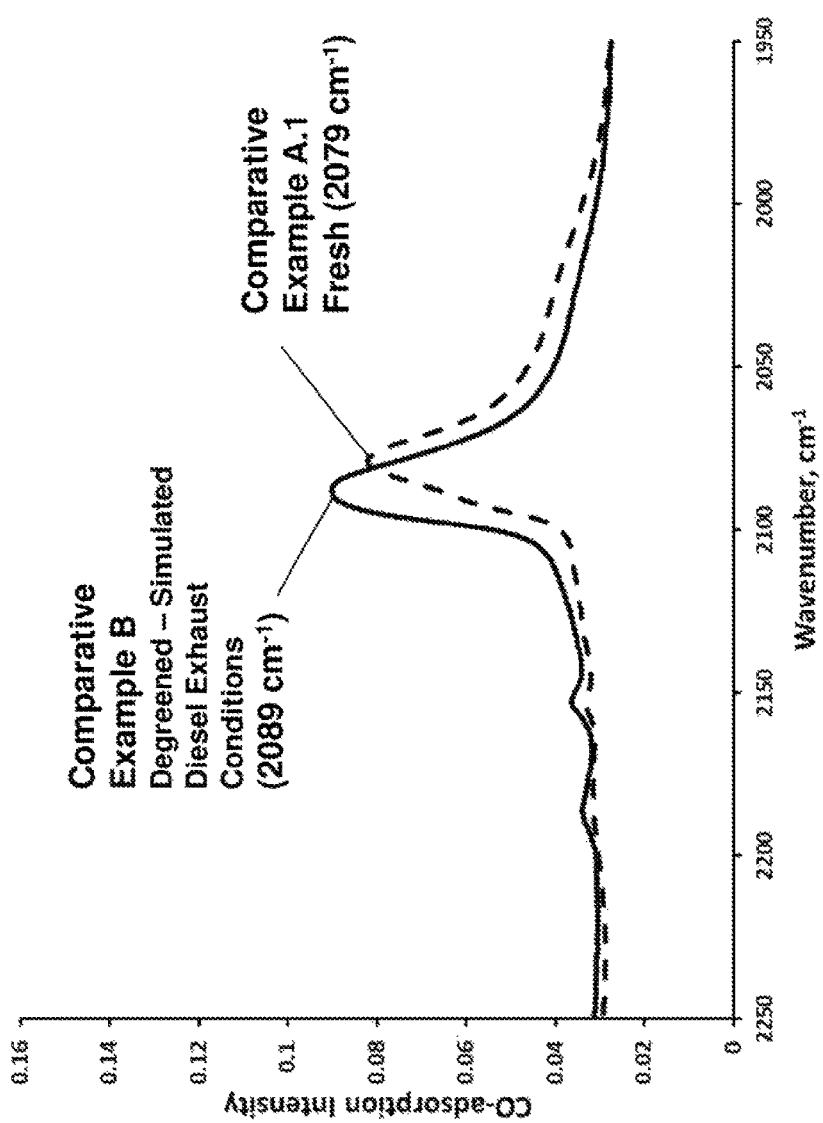
FIG. 2
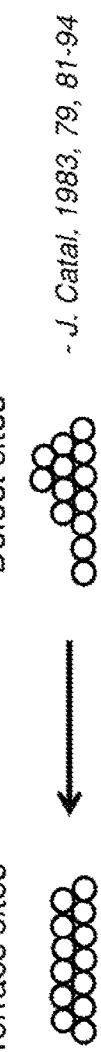
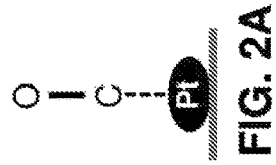
FIG. 2A
FIG. 2B

PLATINUM-CONTAINING CATALYSTS FOR COMBUSTION ENGINES

CROSS-REFERENCE TO RELATED APPLICATIONS

The present application is a U.S. National Stage of International Patent Application PCT/US2016/020668, filed Mar. 3, 2016, and claims priority to U.S. Provisional Patent Application No. 62/128,801, filed Mar. 5, 2015. The disclosures of each of the applications noted above are incorporated herein by reference in their entirety.

TECHNICAL FIELD OF THE INVENTION

The present invention is directed to catalysts for emissions treatment systems of combustion engines. More particularly, the invention pertains to a platinum-containing catalyst that is degreened during production. Such catalysts provide excellent and consistent conversion of nitrogen oxide (NO) to nitrogen dioxide ($NO_2$).

BACKGROUND OF THE INVENTION

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability and their ability to generate high torque at low speed. Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions.

Diesel oxidation catalysts (DOCs) and catalyzed soot filter (CSF) catalysts are typically platinum-based or platinum-palladium-based and are used to accelerate NO oxidation, generating $NO_2$ which in turn oxidizes the soot, which may be trapped in a downstream particulate filter or in the CSF. For a heavy-duty diesel (HDD) system involving a Selective Catalytic Reduction (SCR) catalyst downstream of the DOC or CSF, maintaining a relatively stable DOC-out or CSF-out $NO_2/NO_x$ ratio leading into the SCR is highly desirable for accurate calibration of urea injection, which leads to improved $NO_x$ abatement at the tailpipe of the exhaust system.

Pt-based or Pt-dominated DOCs and CSF catalysts are known to display various degrees of degreening, that is, fresh state of the art catalysts experience enhanced activity only after being in use for a period of time, which means that during the degreening period, lower $NO_2$ is generated from NO than the intrinsic activity of the catalysts would allow. Such a significant degreening effect is undesirable for maintaining the performance of the downstream SCR catalyst (as it results in an unstable $NO_2/NO_x$ ratio leading into the SCR catalyst over time).

Degreening of DOCs and CSF catalysts under exhaust conditions can be simulated by treatment in an exhaust gas mixture at temperatures typically of about 450 to about 500° C., for a duration in the range of about 1 to about 4 hours. Such high temperature conditions are not always predictably achieved during regular lean engine operation, which means that the point at which the catalysts are fully degreened and produce a stable amount of $NO_2$ varies from vehicle-to-vehicle. Under HDD operating conditions, for example, it is common that the engine-out exhaust temperature does not exceed 300° C. for a long period of time. After full degreening of a catalyst on a diesel vehicle, the catalyst performance is relatively stable until long term degradation slowly occurs over thousands of hours of use and/or by exposure to catalyst poisons, such as sulfur and phosphorous.

There is a need to develop high performance DOCs and CSF catalysts that are degreened during production rather than during use, thereby facilitating stable $NO_x$ conversion with downstream systems such as those comprising an SCR catalyst.

SUMMARY OF THE INVENTION

Provided herein are degreened catalytic materials, as well as preparation methods and uses for such materials (e.g., degreened DOCs and CSF catalysts). In particular, DOCs and CSF catalysts containing platinum, that is, platinum (Pt)-only along with platinum/palladium (Pt/Pd) catalysts have both Pt oxidation states and Pt surface configurations that are particularly favorable for NO oxidation. As described in detail herein such surface transformation can be achieved, e.g., by replacing traditional calcination in air in a calcination furnace at temperatures in the range of 450-500° C. with treatment conditions of temperatures greater than or equal to about 500° C. in humidified air. This method allows fresh catalysts to be produced in fully degreened form, which is a highly desirable feature.

In a first aspect, a diesel oxidation catalyst composite is provided, which comprises: a diesel oxidation catalytic material on a carrier, the catalytic material comprising a platinum component on a high surface area refractory metal oxide support, wherein the catalytic material exhibits a peak vibration frequency in the range of about 2085 to about 2105 $cm^{-1}$ as measured by CO-DRIFTS prior to exposure to operating conditions of a vehicle having a diesel engine.

The catalytic material may, in some embodiments, be essentially-free of platinum oxide species found at greater than (>) about 2110 $cm^{-1}$ as measured by CO-DRIFTS. Specific embodiments provide that the catalyst composite is fully degreened during production of the catalyst material.

In one or more embodiments, upon exposure to continuous operation of a vehicle having a diesel engine in a range of about 200° C. to about 350° C., the catalytic material continues to exhibit a peak vibration frequency of about 2085 to about 2105 $cm^{-1}$ as measured by CO-DRIFTS.

The platinum component may, in some embodiments, be in particulate form with an average particle size of about 0.5 to about 6 nm as measured by a CO-chemisorption method. The catalytic material may optionally further comprise a palladium component. The platinum to palladium ratio by weight in such embodiments may be approximately 10:1 to 2:1. The carrier may, in various embodiments, be a flow-through substrate or a wall-flow filter. The high surface area refractory metal oxide support may comprise alumina, titania, zirconia, ceria, silica, or combinations thereof.

Diesel oxidation catalyst composites as described herein can be provided by various methods; however, in certain embodiments, such catalyst are prepared according to the steps of: obtaining a catalytic material comprising a platinum component on a high surface area refractory metal oxide support; depositing the catalytic material onto a carrier to form a diesel oxidation catalyst composite; and treating the catalytic material at a temperature of at least about 500°

C. in the presence of humidity and oxygen to form the fully degreened diesel oxidation catalyst composite.

Another aspect of the present invention provides a method for treating exhaust gases comprising contacting a gaseous stream comprising nitrogen oxides ($NO_x$), the method comprising passing the gaseous stream through any diesel oxidation catalyst composite disclosed herein.

A further aspect is a method for forming a fully degreened diesel oxidation catalyst composite, the method comprising: obtaining a catalytic material comprising a platinum component on a high surface area refractory metal oxide support; depositing the catalytic material onto a carrier to form a diesel oxidation catalyst composite; and treating the catalytic material under conditions of a temperature of at least about 500° C. in the presence of humidity and oxygen to form the fully degreened diesel oxidation catalyst composite.

The catalytic material may, in some embodiments, be provided as a slurry of the platinum component and the high surface area refractory metal oxide support. In certain embodiments, the treating step is conducted before the depositing step. In other embodiments, the treating step is conducted after the depositing step.

In certain embodiments, the high surface area refractory metal oxide support may be first applied to the carrier, followed by addition of the platinum component, and the method can comprise treating the catalytic material after the depositing step of depositing the platinum component onto the carrier.

The temperature may be in the range of 550 to 650° C. The humidity may be in the range of about 0.1 to about 20% by volume. A typical duration of treating may be in the range of about 30 seconds to about 3 hours.

In a further aspect, the disclosure provides a fully degreened diesel oxidation catalyst composite comprising: a diesel oxidation catalytic material on a carrier, the catalytic material comprising a platinum component on a high surface area refractory metal oxide support, wherein the catalytic material exhibits a peak vibration frequency in the range of about 2085 to about 2105 $cm^{-1}$ as measured by CO-DRIFTS prior to exposure to operating conditions of a vehicle having a diesel engine, prepared according to the steps of: obtaining a catalytic material comprising a platinum component on a high surface area refractory metal oxide support; depositing the catalytic material onto a carrier to form a diesel oxidation catalyst composite; and treating the catalytic material at a temperature of at least about 500° C. in the presence of humidity and oxygen to form the fully degreened diesel oxidation catalyst composite.

BRIEF DESCRIPTION OF THE DRAWINGS

The disclosure may be more completely understood in consideration of the following detailed description of various embodiments of the disclosure in connection with the accompanying drawings, in which:

FIG. 2 provides a graph of CO adsorption intensity versus wavenumber ($cm^{-1}$) for a fresh catalyst and for a catalyst that was degreened under simulated conditions of a diesel engine;

FIG. 2A provides a schematic depiction of CO adsorption on a surface of a platinum particle; and FIG. 2B provides a schematic depiction of the configuration of platinum particles before and after exposure to degreening conditions;

DETAILED DESCRIPTION OF THE INVENTION

Figure 1:
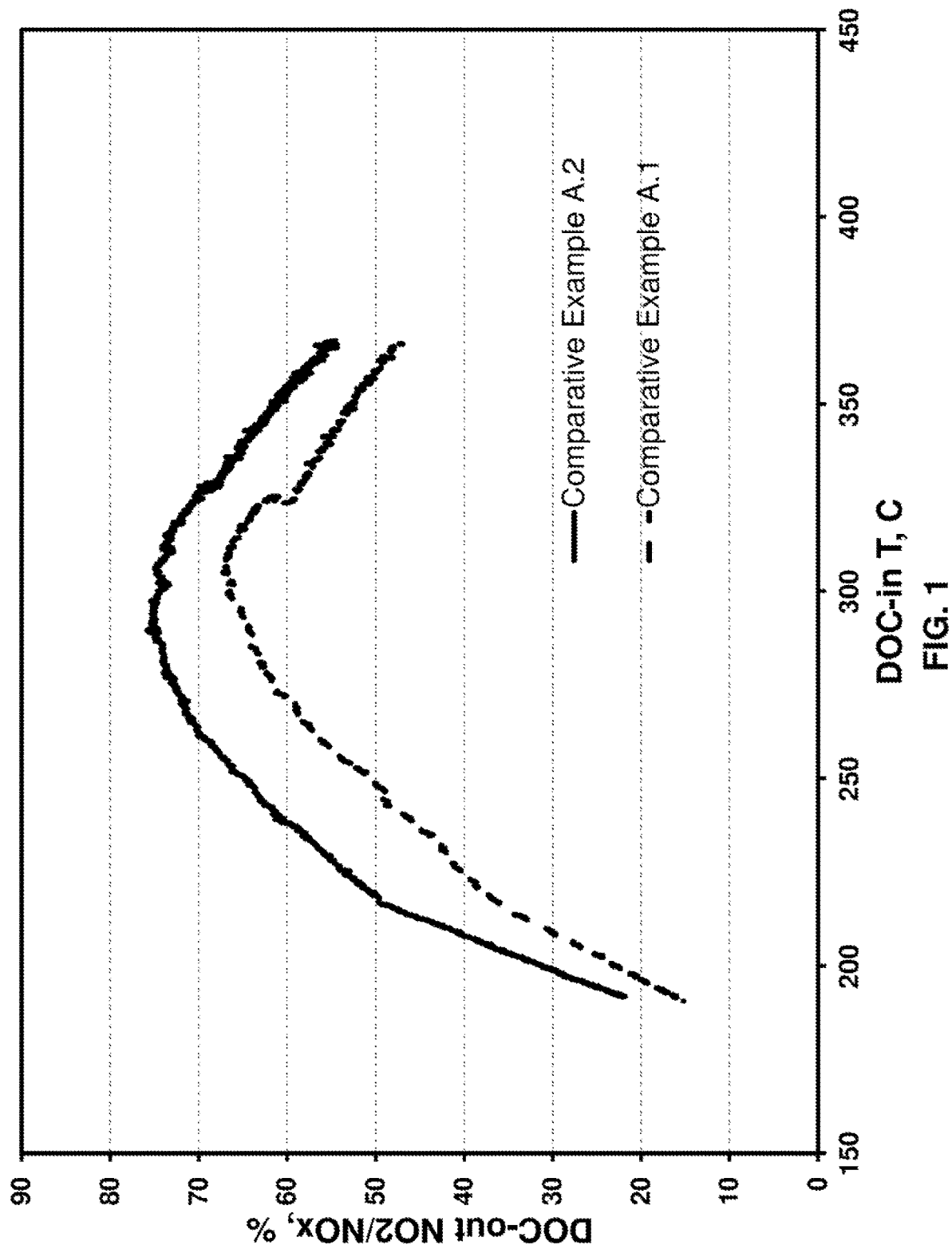
FIG. 1 provides a graph of % conversion of NO to $NO_2$ versus temperature (° C.) for Comparative Example A.1, tested fresh and Comparative Example A.2, which was degreened on the engine.

Providing degreened catalytic materials for use in DOCs and CSF catalysts as described herein can have a tremendous impact on downstream SCR catalyst performance. Through degreening, platinum (Pt) on the catalyst surface becomes more efficient and favorable for NO oxidation. Specifically, NO oxidation is most favorable on a flat surface of metallic Pt. During degreening, there are two primary effects on surface Pt. The first effect of degreening is an oxidation state change of surface Pt, from $PtO_x$ to metallic Pt. Second, there is a surface crystal plane change of Pt crystallites. In FIG. 2B, a Pt surface crystallite is depicted in a fresh state, having numerous "defect sites," or a configuration where many corners or kinks are present. Upon degreening, surface Pt changes to having predominately terraced sites or a terraced configuration. The presence of a peak vibration frequency of about 2085 to about 2105 $cm^{-1}$ as measured by Carbon Monoxide—Diffuse Reflectance Infrared Fourier Transform Spectroscopy (CO-DRIFTS) indicates Pt in a terraced configuration. The activity change in the course of degreening is not related to the Pt dispersion.

Because the DOCs and CSF catalysts provided herein are fully degreened during production of the catalyst material (that is, prior to exposure to operating conditions of a vehicle having a diesel engine), when the DOCs and/or SCF catalysts are employed within an exhaust stream, a stable amount of $NO_2$ is produced in the exhaust stream, which permits engine and automobile designers to readily design catalytic components downstream of the DOC and CSF catalysts. As noted above, catalysts that are not degreened during production do not provide a stable amount of $NO_2$. Such catalysts do not exhibit of a peak vibration frequency of about 2085 to about 2105 $cm^{-1}$ as measured by CO-DRIFTS. Thus, catalysts not degreened during production that are used in continuous operation of a vehicle having a diesel engine under temperatures of about 200° C. to about 350° C., would not exhibit a peak vibration frequency of about 2085 to about 2105 cm$^{-1}$ as measured by CO-DRIFTS, and would produce changing NO$_2$ levels as the NO oxidation catalyst function slowly degreens during vehicle operation.

The following definitions are used herein.

Reference to a "fresh catalyst" means a catalyst from production that has not been exposed to exhaust conditions—actual or simulated—of a vehicle having a combustion engine, such as a diesel engine.

Reference to "degreening conditions" means exposure to an exhaust gas mixture at a temperature of about 450° C. or greater. Such conditions may occur during operating conditions of a vehicle having a diesel engine as described above for traditional catalysts, or may occur during production as provided herein.

Reference to a "fully degreened catalyst" means a catalyst that has been exposed to degreening conditions for a time adequate to provide stable NO to NO$_2$ conversions. Stable conversions are those that are within +5% of each other over time, that is, from one measurement to the next. For this disclosure, stable conversion of NO to NO$_2$ is desired to, for example, facilitate nitrogen oxides (NO$_x$) conversion in downstream systems such as SCR catalysts. Full degreening will eventually occur during diesel vehicle operations as currently in the art. The inventive concept here is to prepare a fully degreened catalyst during the production process for the catalyst or catalyst composite, such that full degreening is achieved prior to diesel vehicle operations in which the catalyst or catalyst composite is involved.

Reference to a "degreened catalyst" means a catalyst that is operating at a higher and stable conversion of desired constituents than a comparable fresh state of the art catalyst.

Reference to "degreened during production" means that exposure to degreening conditions occurs at the time the catalyst is being made (rather than completely during vehicle operation), regardless of where the catalyst is being made, for example, in a manufacturing line or in a laboratory setting.

CO Diffuse Reflectance Infrared Fourier Transform Spectroscopy (CO-DRIFTS) is a characterization method to describe surface character of a catalyst by using infrared spectroscopy to monitor CO molecules adsorbed on the surface of the catalyst. Results are provided as the vibration frequency (wavenumbers) of adsorbed CO molecules, which depends on surface character of a catalyst.

"PGM" refers to platinum group metals, including palladium, platinum, rhodium, ruthenium, osmium, and/or iridium.

Other suitable catalytic metals include transition group metals that may provide catalytic activity including, but not limited to, copper, silver, and gold.

A "PGM component" refers to any compound that includes a PGM. For example, the PGM may be in metallic form (zero valence), or the PGM may be in an oxide form. The PGM may be also in a mixed state. For example, the PGM surface may be in an oxide form, whereas the PGM core may be in metallic form. PGM components can be provided in particle form. Reference to "PGM component" allows for the presence of the PGM in any valence state. For example, platinum may be present in Pt$^0$ and/or Pt$^{2+}$, or Pt$^{4+}$. Also, for example, palladium may be present in Pd$^0$ and/or Pd$^{2+}$, or Pd$^{4+}$.

Essentially-free of platinum oxide species means no more than about 5 wt. % of platinum oxides species are present, or even less than about 2.5 wt. %, or about 1 wt. %, or about 0.5 wt. % or about 0.1 wt. %, or even about 0.01 wt. %.

An "alloyed" PGM particle is an intimate and random mixture of different PGM components, known in the art as a solid solution.

"Precursor compound" refers to a compound that delivers a desired ingredient. For example, water-soluble, inorganically-based, or organically-based salts may be desired for delivery of PGMs and other materials such as alumina, cerium, zirconium, barium, and the like.

"BET surface area" has its usual meaning of referring to the Brunauer-Emmett-Teller method for determining surface area by N$_2$-adsorption measurements. Unless otherwise stated, "surface area" refers to BET surface area.

"Support" in a catalytic material or catalyst washcoat refers to a material that receives precious metals, stabilizers, promoters, binders, and the like through precipitation, association, dispersion, impregnation, or other suitable methods. Examples of supports include, but are not limited to, refractory metal oxides, including high surface area refractory metal oxides, and composites containing oxygen storage components.

"Refractory metal oxide supports" include bulk alumina, ceria, zirconia, titania, silica, magnesia, neodymia, mixed oxides (for example MgAl$_2$O$_4$, BaAl$_2$O$_4$, LaAlO$_3$) or doped oxides (for example Ba-doped alumina, Ce-doped alumina, La-doped alumina) and other materials are known for such use. Such materials are considered as providing durability to the resulting catalyst. Refractory metal oxide supports are generally porous.

"High surface area refractory metal oxide supports" refer specifically to support particles having BET surface areas of higher than 30 square meters per gram ("m$^2$/g"), pores larger than 20 Å, and a wide pore distribution. High surface area refractory metal oxide supports, e.g., alumina support materials, also referred to as "gamma alumina" or "activated alumina," typically exhibit a BET surface area in excess of 60 m$^2$/g", and often up to about 200 m$^2$/g or higher. Such activated alumina is usually a mixture of the gamma and delta phases of alumina, but may also contain substantial amounts of eta, kappa and theta alumina phases.

"Rare earth metal oxides" refer to one or more oxides of scandium, yttrium, and the lanthanum series defined in the Periodic Table of Elements, which are exemplary promoter materials. Suitable promoters include one or more non-reducible oxides of yttrium, zirconium or one or more rare earth metals selected from the group consisting of lanthanum, neodymium, praseodymium and mixtures thereof.

"Alkaline earth metal oxides" refer to Group II metal oxides, which are exemplary stabilizer materials. Suitable stabilizers include one or more non-reducible metal oxides wherein the metal is selected from the group consisting of barium, calcium, magnesium, strontium and mixtures thereof.

"Washcoat" is a thin, adherent coating of a catalytic or other material applied to a refractory substrate, such as a honeycomb flow through monolith substrate or a filter substrate, which is sufficiently porous to permit the passage therethrough of a gas stream being treated. A "washcoat layer," therefore, is defined as a coating that is comprised of support particles. A "catalyzed washcoat layer" is a coating comprising support material impregnated with one or more catalytic components.

"DOC" refers to diesel oxidation catalysts, which convert hydrocarbons and carbon monoxide in the exhaust gas of a diesel engine. Typically, a DOC comprises one or more platinum group metals such as platinum and/or palladium, a support material such as alumina, and optionally, one or more promoters and/or stabilizers.

"CSF" (or "CSF catalyst") refers to a catalyzed soot filter, which is a wall-flow monolith having an oxidation catalyst suitable to collect soot particles at low temperature and to burn soot during regeneration conditions.

Both the DOC and CSF also serve to oxidize NO to $NO_2$, which after injection of a urea reducing agent into the exhaust stream, facilitates $NO_x$ reduction on a downstream SCR catalyst.

A "carrier" is a monolith support, examples of which include, but are not limited to, honeycomb flow through substrates and wall-flow filter substrates.

Catalyst Composites Prior to Calcination

Catalytic materials are obtained, for example, by mixing a source of platinum and/or palladium with a support, such as a high surface area refractory metal oxide support.

Typically, when a platinum group metal is desired, a metal precursor compound is utilized in the form of a solution-soluble compound or complex to achieve dispersion of the component on a high surface area refractory metal oxide support, e.g., activated alumina. For the purposes herein, the term "metal component" means any metal-containing compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. As known in the art, PGM precursor compounds may be added to a refractory metal oxide support (e.g., a high surface area refractory metal oxide support) either before or after the washcoat is applied to the monolith. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of PGMs are utilized.

For PGMs, a water-soluble salt may be used for delivery. Such salts include but are not limited to: amine salts, nitrate salts, and acetate salts. Alternatively, PGMs may be provided as nanoparticles on a support. For example, U.S. Patent Appln. Pub. No. 2011/0033353 to Siani et al., incorporated herein by reference, discloses preparation of diesel oxidation catalysts via deposition of colloidal nanoparticles.

Once the catalytic materials are obtained, a catalyst composite may be prepared in one or more layers on a carrier. A dispersion of any one or more of the catalytic materials as described herein may be used to form a slurry for a washcoat. To the slurry may be added any desired additional ingredients such as other platinum group metals, other supports, other stabilizers and promoters, and/or one or more oxygen storage components.

In one or more embodiments, the slurry is acidic, having a pH of about 2 to about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. The slurry may thereafter be comminuted to result in substantially all of the solids having particle sizes of less than about 20 microns, i.e., about 0.1 to about 15 microns, in average diameter. The comminution may be accomplished in a ball mill or other similar equipment, and the solids content of the slurry may be, e.g., about 10 to about 50 wt. %, more particularly about 10 to about 40 wt %. The carrier may then be dipped one or more times into such slurry or the slurry may be coated on the carrier such that there will be deposited on the carrier the desired loading of the washcoat/metal oxide composite, e.g., about 0.5 to about 3.0 $g/in^3$.

Calcination/Degreening During Production

Each washcoat layer deposited on the carrier is dried and calcined. Drying conditions are typically at a temperature of about 100° C. to about 125° C. Calcining to achieve degreening during production is achieved by heating, e.g., at about 500° C. to about 650° C. in humidified air for about 30 seconds to about 3 hours, or preferably from about 1 minute to about 1 hour, or even about 10 to about 30 minutes, depending on the air flow rate passing through the catalyst. Higher temperature and higher flow rate shorten the time needed. The content of steam may vary as needed, depending on conditions of the furnace being used. Steam content by volume in the range of about 0.1 to about 20%, or about 1 to about 10%, or about 1.5 to about 7%, or about 5% may be used. Flow rate of humidified air will impact the rate of degreening during production. The lower the flow rate, the longer the time required for calcination/degreening.

During the calcination step, the PGMs are converted into a catalytically active form of the metal or a compound thereof. In addition, with specific respect to platinum (Pt), its oxidation state and surface configurations transform during the steam calcination/degreening step to those that are most favorable for NO oxidation (as described herein above).

Carrier

In one or more embodiments, a catalytic material as disclosed herein is disposed on a carrier.

The carrier may be any of those materials typically used for preparing catalyst composites, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages are defined by walls on which the catalytic material is coated as a washcoat so that gases flowing through the passages contact the catalytic material. Such structures may contain from about 60 to about 900 or more gas inlet openings (i.e., cells) per square inch of cross section. For ceramic monoliths, these cells are usually square or hexagonal in shape. The carrier may be made of any suitable refractory material, usually cordierite.

The carrier can also be a wall-flow filter substrate, where the channels are alternately blocked, allowing a gaseous stream entering the channels from one direction (inlet direction), to flow through the channel walls and exit from the channels from the other direction (outlet direction). When a catalyst is applied to the wall-flow filter substrate, the resulting system will be able to remove particulate matters along with gaseous pollutants. The wall-flow filter carrier can be made from materials commonly known in the art, such as cordierite, silicon carbide, or aluminum titanate.

The carriers useful for the catalysts of the present invention may also be metallic in nature. The metallic carriers may be employed in various shapes such as corrugated sheet. Preferred metallic supports include the heat resistant metals and metal alloys such as titanium and stainless steel as well as other alloys in which iron is a substantial or major component. Such alloys may contain one or more of nickel, chromium and/or aluminum. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Before describing several exemplary embodiments of the invention, it is to be understood that the invention is not limited to the details of construction or process steps set forth in the following description. The invention is capable of other embodiments and of being practiced in various ways. In the following, preferred designs are provided, including such combinations as recited used alone or in unlimited combinations, the uses for which include catalysts, systems, and methods of other aspects of the present invention.

EMBODIMENTS

Various embodiments are listed below. It will be understood that the embodiments listed below may be combined with all aspects and other embodiments in accordance with the scope of the invention.

Embodiment 1

A diesel oxidation catalyst composite comprising: a diesel oxidation catalytic material on a carrier, the catalytic material comprising a platinum component on a high refractory metal oxide support, wherein the catalytic material exhibits a peak vibration frequency in the range of 2085-2105 $cm^{-1}$ as measured by CO-DRIFTS prior to exposure to operating conditions of a vehicle having a diesel engine.

Embodiment 2

The diesel oxidation catalyst composite of embodiment 1, wherein the catalytic material is essentially-free of platinum oxide species found at >2110 $cm^{-1}$ as measured by CO-DRIFTS.

Embodiment 3

The diesel oxidation catalyst composite of any of embodiments 1-2, wherein the catalyst composite is fully degreened during production.

Embodiment 4

The diesel oxidation catalyst composite of any of embodiments 1-3, wherein upon exposure to continuous operation of a vehicle having a diesel engine in a range of 200° C. to 350° C., the catalytic material continues to exhibit a peak vibration frequency of 2085-2105 $cm^{-1}$ as measured by CO-DRIFTS.

Embodiment 5

The diesel oxidation catalyst composite of any of embodiments 1-4, wherein the platinum component has an average particle size in the range of 0.5-6 nm as measured by CO-chemisorption method.

Embodiment 6

The diesel oxidation catalyst composite of any of embodiments 1-5, wherein the catalytic material further comprises a palladium component.

Embodiment 7

The diesel oxidation catalyst composite of embodiment 6, wherein the platinum to palladium ratio by weight is approximately 10:1 to 2:1.

Embodiment 8

The diesel oxidation catalyst composite of any of embodiments 1-7, wherein the carrier is a flow-through substrate or a wall-flow filter.

Embodiment 9

The diesel oxidation catalyst composite of any of embodiments 1-8, wherein the high refractory metal oxide support comprises alumina, Mania, zirconia, ceria, silica, or combinations thereof.

Embodiment 10

A method for treating exhaust gases comprising contacting a gaseous stream comprising nitrogen oxides ($NO_x$), the method comprising passing the gaseous stream through the diesel oxidation catalyst composite of any of claims 1-9.

Embodiment 11

A method for forming a fully degreened diesel oxidation catalyst composite, the method comprising: obtaining a catalytic material comprising a platinum component on a high refractory metal oxide support; depositing the catalytic material onto a carrier to form the composite; and treating the catalytic material under conditions of a temperature of at least 500° C. in the presence of humidity and oxygen to form the fully degreened diesel oxidation catalyst composite.

Embodiment 12

The method of embodiment 11, wherein the catalytic material is provided as a slurry of the platinum component and the high surface area refractory metal oxide support.

Embodiment 13

The method of any of embodiments 11-12, wherein the catalytic material is treated before the step of depositing the catalytic material onto the carrier.

Embodiment 14

The method of any of embodiments 11-12, wherein the catalytic material is treated after the step of depositing the catalytic material onto the carrier.

Embodiment 15

The method of any of embodiments 11-14, wherein the high surface area refractory metal oxide support is first applied to the carrier, followed by addition of the platinum component, and wherein the catalytic material is treated after the step of depositing the platinum component onto the carrier.

Embodiment 16

The method of any of embodiments 11-15, wherein the temperature is in the range of 550 to 650° C.

Embodiment 17

The method of any of embodiments 11-16, wherein the humidity is in the range of 0.1 to 20% by volume.

Embodiment 18

The method of any of embodiments 11-17, wherein a duration of the treating step is in the range of 30 seconds to 3 hours.

EXAMPLES

The following non-limiting examples shall serve to illustrate the various embodiments of the present invention.

Comparative Example A.1—Fresh

A 5% $SiO_2$—$Al_2O_3$ support material was added into a diluted solution of colloidal Pt and 2.5% alumina binder (based on the support), the mixture was milled to $D_{90}$=12-15 µm, then coated at appropriate solid content onto a honeycomb substrate. The resulting washcoat loading was 1.037 g/in$^3$, and the Pt loading was 10 g/ft$^3$. After drying at 110° C./4 hours, the catalyst was calcined in air within a traditional box furnace at 450° C. for 1 hour.

Comparative Example A.2—Degreened Under Diesel Exhaust Conditions

The fresh catalytic material according to Example A.1 was coated onto a full size substrate of 10.5×10.5×6" dimension, which was then mounted onto a heavy duty diesel engine and evaluated with a light-off protocol in the temperature range 150-450° C. The temperature ramp was achieved by continuously increasing engine load at fixed engine speed. An engine degreening procedure (550° C. for 30 minutes at the DOC inlet) was then applied. The engine-degreened catalyst was retested for NO oxidation activity. A comparison of this Comparative Example A.2 with a fresh Comparative Example A.1 is provided in FIG. 1, where it is shown that engine degreening improved NO oxidation activity relative to the fresh catalyst. Because in practical operation of diesel vehicles such degreening on engine may take hundreds of operating hours or may never occur, there is a need to provide degreened catalysts from production.

Comparative Example B—Degreened Under Simulated Diesel Exhaust Conditions

The catalyst of Example A was treated under simulated operating conditions of a diesel engine with a gas mixture containing 500 ppm NO, 100 ppm CO, 10 ppm $C_3H_6$, 5% $CO_2$, 10% $O_2$ and 7% $H_2O$ in balance $N_2$ in a laboratory reactor at 500° C. for 1 hour, at a flow rate of 12 L/min. FIG. 2 provides a graph of CO adsorption intensity versus wavenumber (cm$^{-1}$) for the fresh catalyst of Comparative Example A.1 and for the catalyst of Comparative Example B that was degreened under simulated conditions of a diesel engine;

The fresh catalyst (Example A) showed a peak vibration frequency of 2079 cm$^{-1}$ via CO-DRIFTS. The catalyst degreened under simulated diesel exhaust conditions (Example B) showed a peak vibration frequency of 2089 cm$^{-1}$ via CO-DRIFTS. FIG. 2A is a schematic depiction of CO adsorption on the surface of a platinum particle. The CO-DRIFTS data demonstrates that the platinum particles experienced surface reconstruction during "degreening", which involves transformation to a terraced surface or configuration, from a surface dominated by corners/kinks/edges, as shown in FIG. 2B. The terraced surface is characterized by the CO adsorption band at 2089 cm–1.

Example 1

Degreened During Production

A 5% $SiO_2$—$Al_2O_3$ support material was added into a diluted solution of colloidal Pt and 2.5% alumina binder (based on the support), the mixture was milled to $D_{90}$=12-15 µm, then coated at appropriate solid content onto a honeycomb substrate. The resulting washcoat loading was 1.037 g/in$^3$, and the Pt loading was 10 g/ft$^3$. After drying at 110° C./4 hours, the catalyst was calcined at SV=50,000/h in a flow through tube furnace at a flow rate of 12 L/min under various conditions as listed in Table 1. The flow through gas contained a mixture of 10% $O_2$ and 7% $H_2O$ (where applicable) in balanced $N_2$.

TABLE 1

|  | Example 1.1 Comparative | Example 1.2 | Example 1.3 | Example 1.4 |
| --- | --- | --- | --- | --- |
| Condition | 1 | 2 | 3 | 4 |
| Steam | No | Yes | Yes | Yes |
| Temperature (° C.) | 500 | 500 | 550 | 590 |
| Time (min) | 60 | 60 | 20 | 10 |

After calcination, the catalysts were evaluated for NO oxidation activity, in a gas mixture containing 500 ppm NO, 100 ppm CO, 10 ppm $C_3H_6$, 5% $CO_2$, 10% $O_2$ and 7% $H_2O$ in balance $N_2$ from 100° to 450° or 500° C. at a temperature ramp rate of 15° C./min and a space velocity of 50,000/h.

Figure 3A:
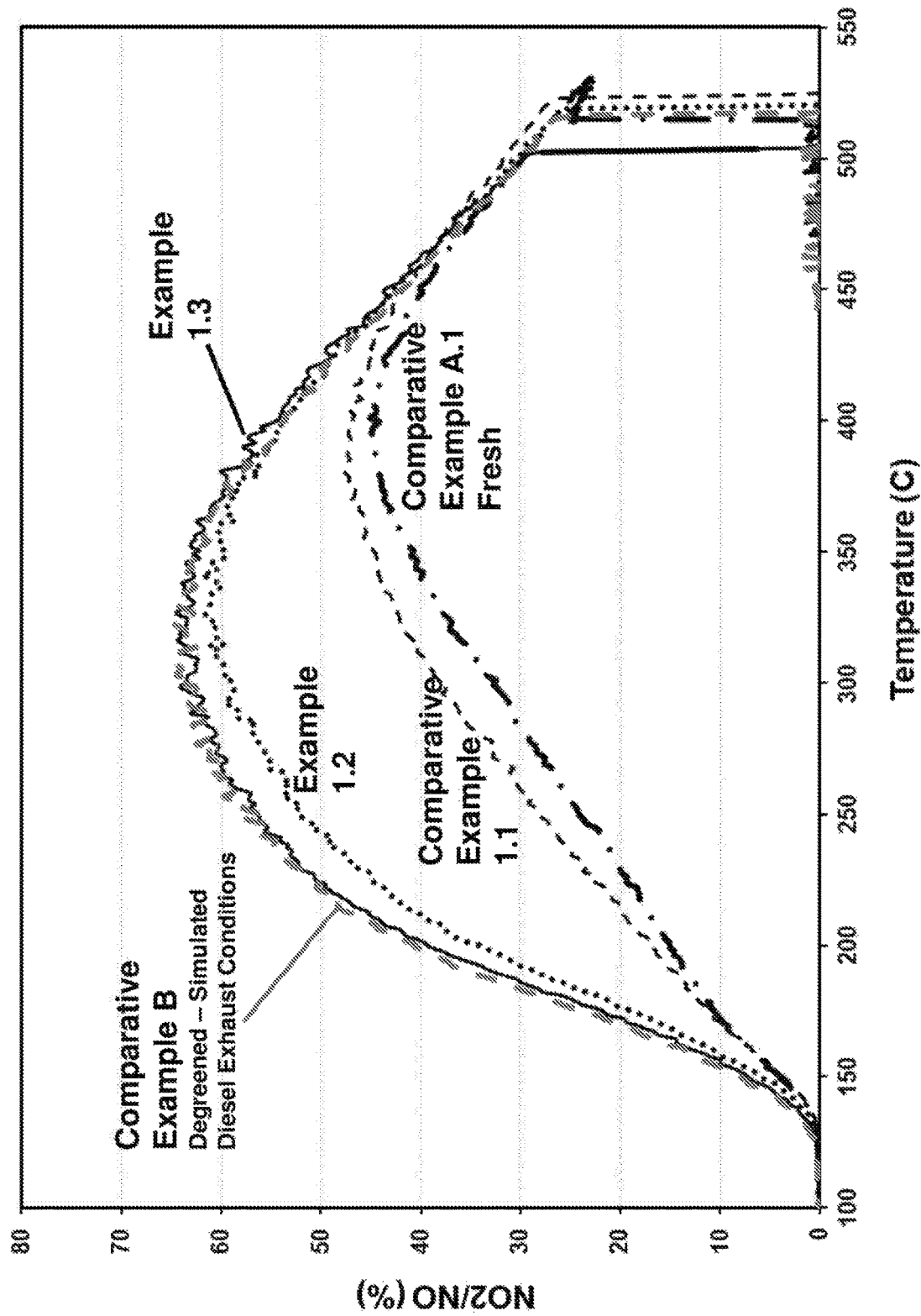
FIG. 3A provides a graph of % conversion of NO to $NO_2$ versus temperature (° C.) for comparative examples and inventive embodiments.

The NO oxidation results of catalysts obtained under Conditions 1-3 (Examples 1.2-1.3) vs fresh (Example 1.1 and Example A) catalyst and degreened (Example B) catalyst are presented in FIG. 3A, where % conversion of NO to $NO_2$ is provided versus temperature (° C.). The degreening effect is signified by the magnitude of activity difference to that obtained by the degreening treatment (Example B). To easily demonstrate the magnitude of the degreening effect, Table 2 shows the data from FIG. 3A at 250° C.

TABLE 2

| Catalyst | NO conversion at 250° C. (%) | NO conversion % Difference to Example B | Dispersion | Calculated Particle Size nm |
| --- | --- | --- | --- | --- |
| A | 22 | 35 | 52.6 | 2.2 |
| B | 57 | — | — | — |

TABLE 2-continued

| Catalyst | NO conversion at 250° C. (%) | NO conversion % Difference to Example B | Dispersion | Calculated Particle Size nm |
|---|---|---|---|---|
| 1.1 | 25 | 32 | 38.3 | 3.0 |
| 1.2 | 52 | 5 | 47.5 | 2.4 |
| 1.3 | 57 | 0 | 42.9 | 2.6 |

Figure 3B:
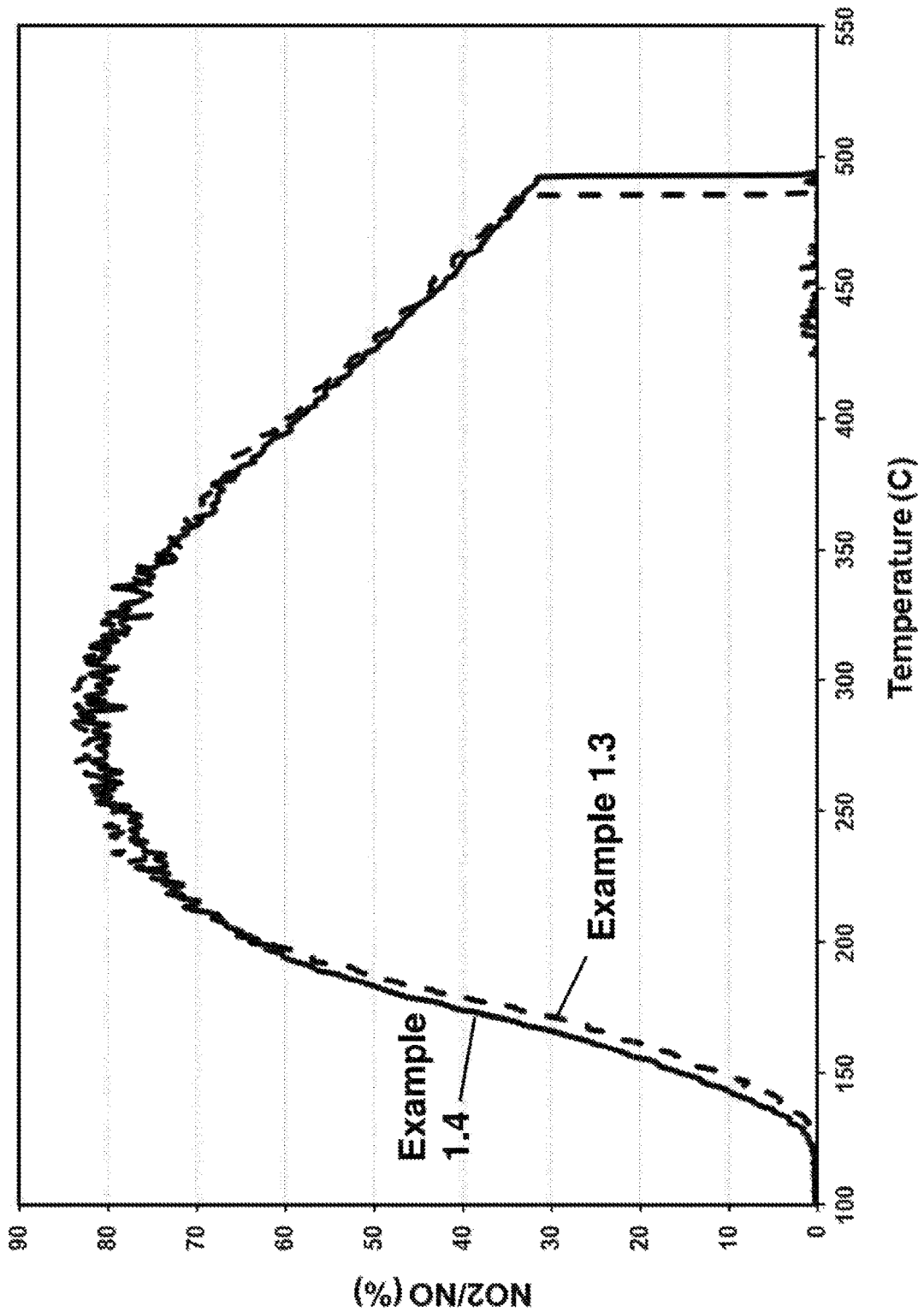
FIG. 3B provides a graph of % conversion of NO to $NO_2$ versus temperature (° C.) for inventive embodiments.

Comparison between Conditions 1 and 2 indicates that addition of 7% steam significantly reduces the degreening effect, that is, the catalyst of Example 1.2 provides a conversion profile of NO to $NO_2$ that is more like the degreened catalyst (Example B) than the fresh catalyst (Example A). Increasing calcination temperature to 550° C., even at reduced duration for 20 minutes, completely eliminated the degreening effect as evidenced by Example 1.3. FIG. 3B provides a comparison of Example 1.3 with 1.4, showing that degreening can be achieved within 10 minutes when the temperature is increased to 590° C.

Dispersion data were collected by CO-chemisorption method. Catalysts were first reduced in 5% $H_2/N_2$ at 400° C., then subject to a pulse of 10% $CO/N_2$ at room temperature. Pt dispersion and particle size were calculated based on the amount of adsorbed CO and the Pt wt. %. Data for Examples A and 1.1-3 are provided in Table 2, which demonstrates that the activity change in the course of degreening is not related to the Pt dispersion, as all catalysts contain Pt particles in the 2-3 nm range.

Powder catalysts on different supports were made by adding support material into a diluted solution of colloidal Pt and 2.5% alumina binder (based on the support) or silica binder for $TiO_2$-based supports, milling the mixture to $D_{90}$=12-15 μm, then coating at appropriate solid content onto a honeycomb substrate. The resulting washcoat loading was 1.037 g/in$^3$, and the Pt loading was 10 g/ft$^3$. These catalysts were degreened in 1 L/m 10% $H_2O$ air flow at 550° C./1 hour. CO-DRIFT band positions for these catalysts are shown in Table 3.

TABLE 3

|  | Example 1.5 | Example 1.6 | Example 1.7 | Example 1.8 |
|---|---|---|---|---|
| Support | γ-$Al_2O_3$ | 5% $SiO_2$—$Al_2O_3$ | $TiO_2$ | 8% $SiO_2$—$TiO_2$ |
| $CO_{ads}$ band position (cm$^{-1}$) | 2093 | 2089 | 2093 | 2096 |

Comparative Example C—Fresh

A 1.5% $SiO_2$—$Al_2O_3$ material was incipient wetness impregnated with a diluted Pt amine complex solution. Then the slurry was milled and coated onto a honeycomb substrate similarly as described in Example 1. After drying, the catalyst was calcined in air in a box furnace at 450° C. for 1 hour.

Example 2—Degreened During Production

Example 2.1 was formed from the same catalyst slurry as Comparative Example C, which was coated onto a honeycomb substrate and after drying, the catalyst was calcined in a flow through tube furnace at 590° C. for 10 minutes in the presence a mixture of 10% $O_2$ and 7% $H_2O$ in balanced $N_2$. Flow rate was 12 L/min and the space velocity was 50,000/h as described for Example 1.4.

Figure 4:
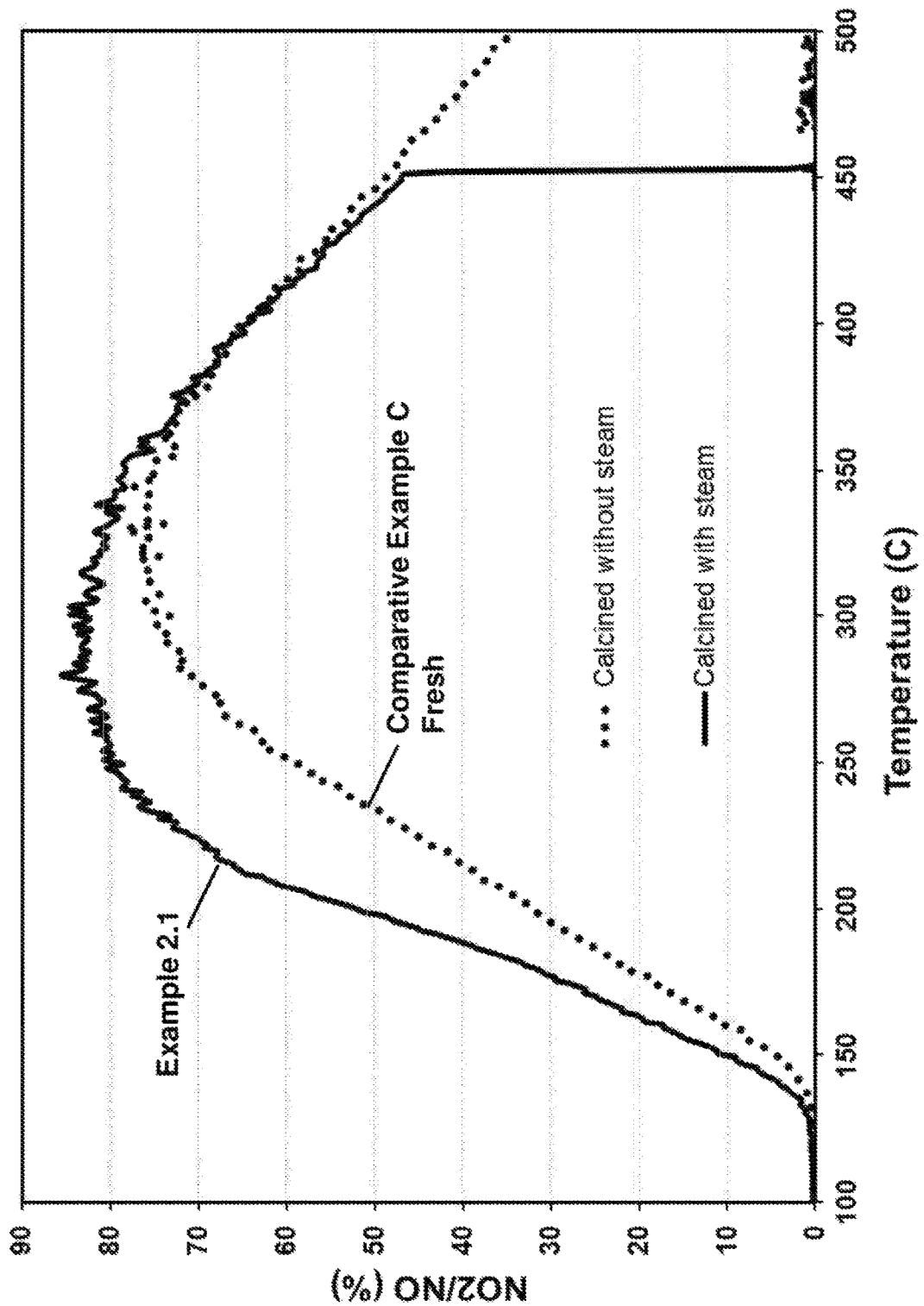
FIG. 4 provides a graph of % conversion of NO to $NO_2$ versus temperature (° C.) for a comparative example and an inventive embodiment.

The NO oxidation behavior using the same gas mixture described in Example 1 is provided in FIG. 4. The catalyst calcined in the presence of steam showed much higher NO to $NO_2$ conversion as compared to Comparative Example C, which was calcined in the absence of steam.

Figure 5:
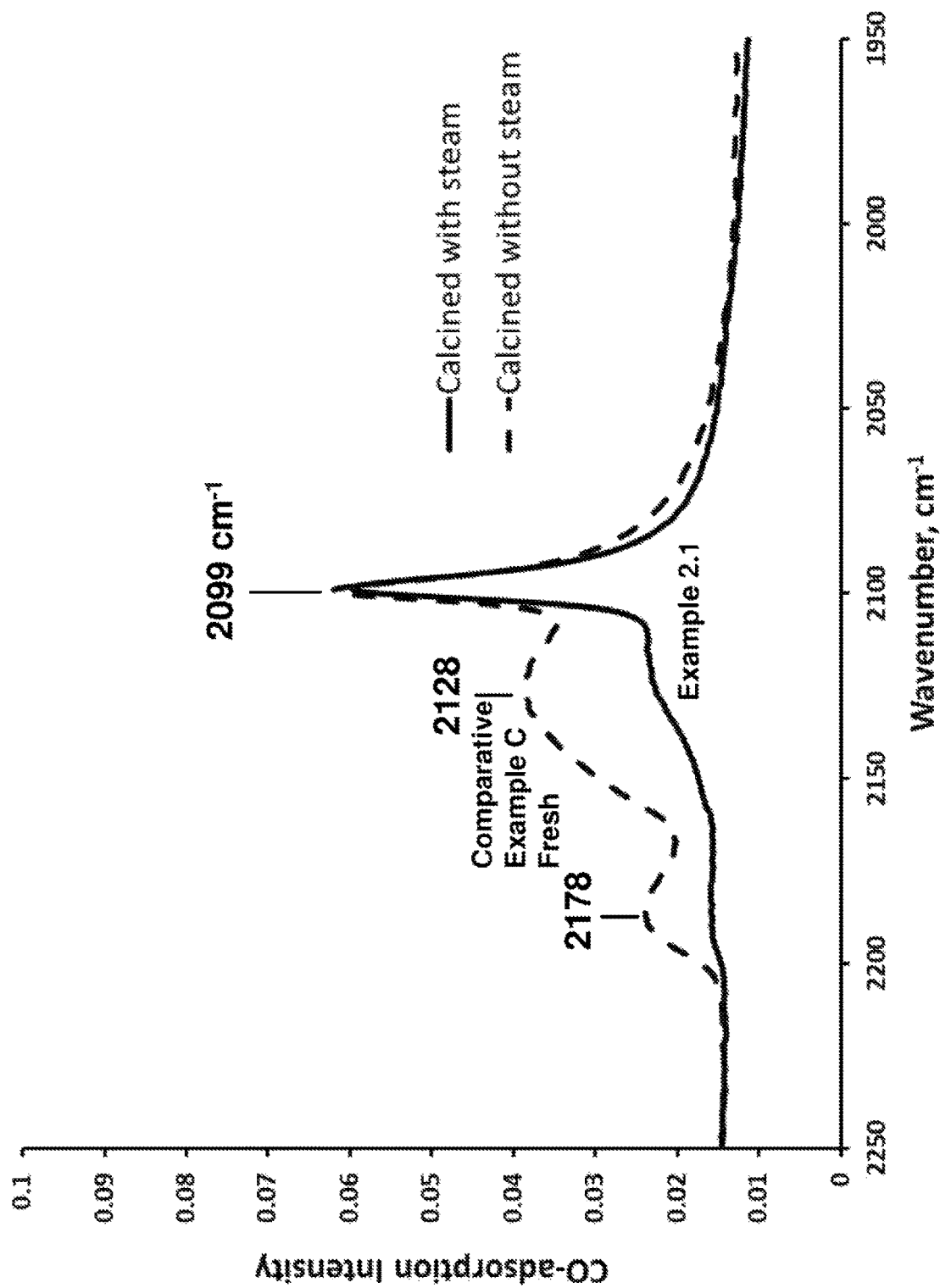
FIG. 5 provides a graph of CO adsorption intensity versus wavenumber ($cm^{-1}$) for a traditionally calcined catalyst and for an inventive catalyst.

The CO-DRIFTS characterization shown in FIG. 5 indicates that charged Pt species, represented by peaks at 2128 & 2178 cm$^{-1}$, are significantly suppressed in the case of steam calcination, whereas the Pt(0) sites (represented by the peak at 2099 cm$^{-1}$) seem unaffected by the method of calcination. Charged Pt species are ineffective in catalyzing NO oxidation, therefore suppressing or preventing the formation of these species contributes to the lack of a degreening effect, which is fulfilled by direct steam calcination of dried catalysts.

Powdered catalysts on different supports were made by impregnating a support material a diluted Pt amine complex solution by incipient wetness. Then the slurry was milled and coated onto a honeycomb substrate similarly as described in Example 1. The peak position of CO—Pt(0) of these catalysts appears to be nearly independent of the support material, a summary is shown in Table 4 of these catalysts calcined in 1 L/m 10% $H_2O$/air flow at 550° C./1 hour.

TABLE 4

|  | Example 2.2 | Example 2.3 | Example 2.4 | Example 2.5 |
|---|---|---|---|---|
| Support | γ-$Al_2O_3$ | 5% $SiO_2$—$Al_2O_3$ | $TiO_2$ | 8% $SiO_2$—$TiO_2$ |
| $CO_{ads}$ band position (cm$^{-1}$) | 2099 | 2098 | 2099 | 2098 |

Examples 1 & 2 indicate that despite different degreening mechanisms as a result of different Pt precursors, degreening can be achieved via the same steam calcination method.

Example 3—Effect of Steam Concentration

Figure 6:
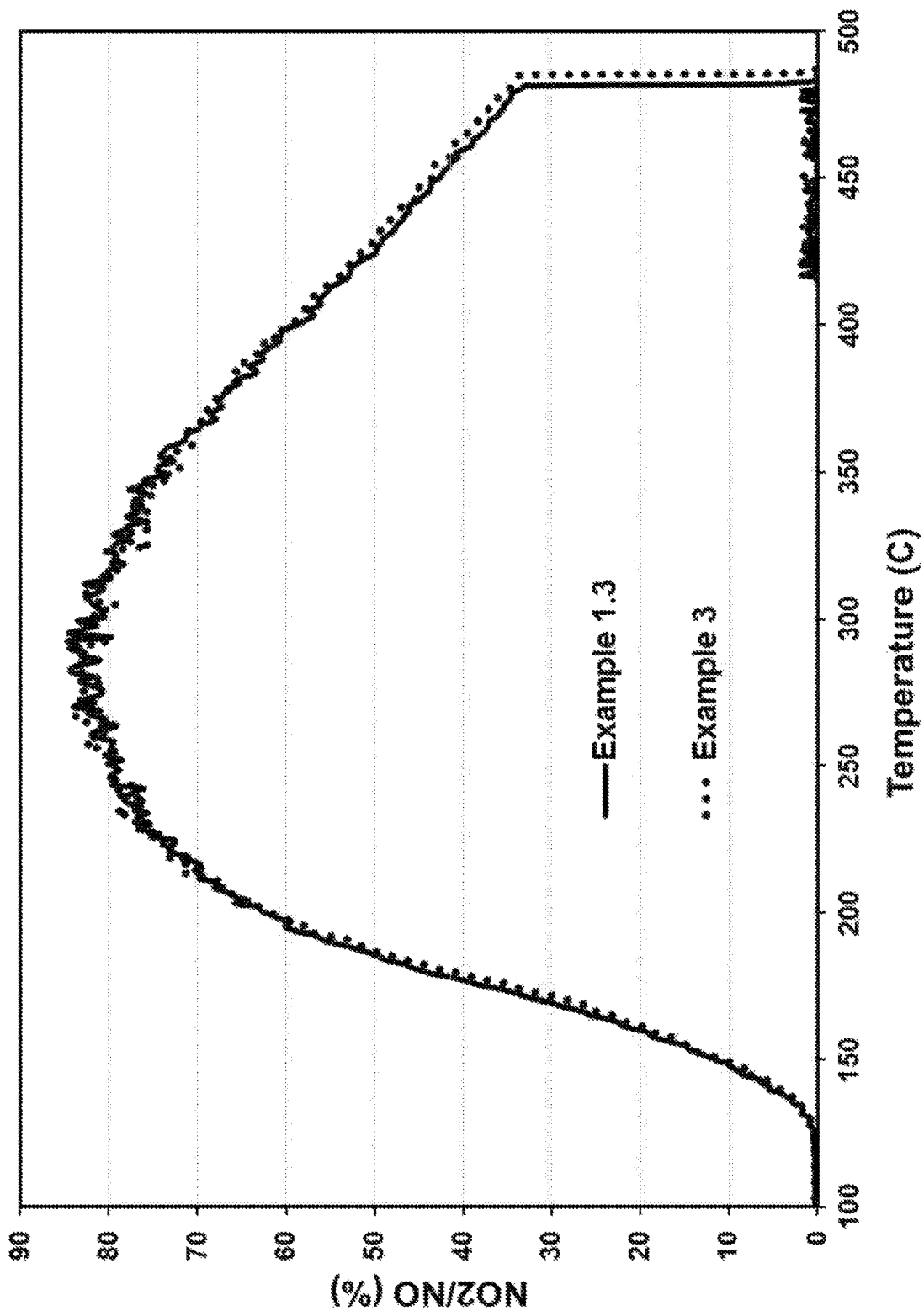
FIG. 6 provides a graph of % conversion of NO to $NO_2$ versus temperature (° C.) for catalysts treated under differing steam concentrations.

Two dried catalysts prepared according to Example 1 were calcined at 550° C. for 20 minutes in the presence of either 7 wt. % (Example 1.3) or 1.7 wt. % (Example 3) steam. Both catalysts showed similar NO oxidation activity immediately after calcination (FIG. 6).

Example 4—Effect of Calcination Air Flow

Figure 7:
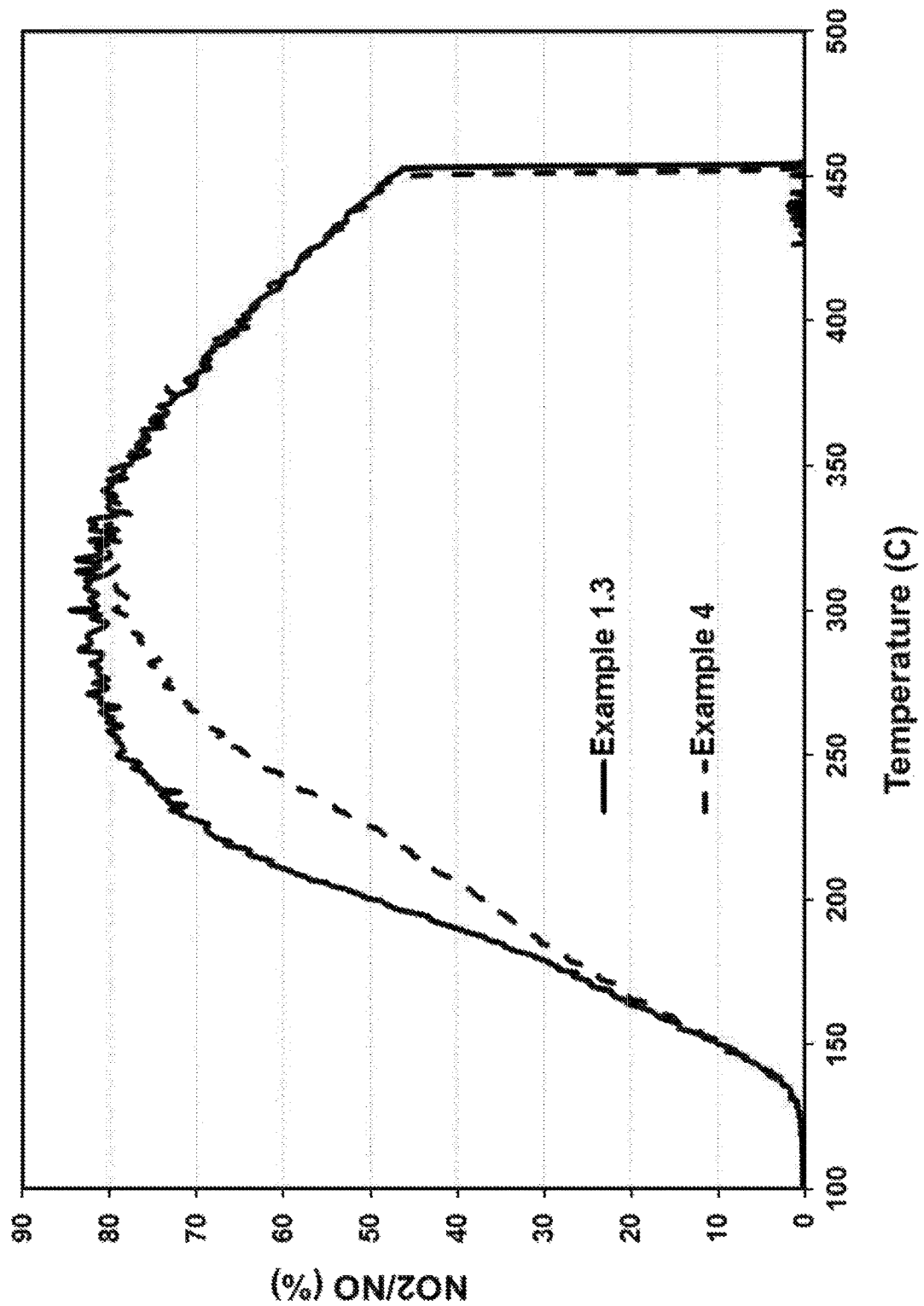
FIG. 7 provides a graph of % conversion of NO to $NO_2$ versus temperature (° C.) for catalysts treated under differing air flow rates.

Two dried catalysts prepared according to Example 2 were calcined at 550° C. for 30 minutes in 7 wt. % steam air at a flow rate either at 12 (Example 1.3) or 1 (Example 4) L/min. The 1 L/min/30 minutes calcined catalyst showed lower activity, as a result of incomplete degreening (FIG. 7). This example demonstrates that passing a minimum amount of steamed air through the catalyst during a set time is needed to achieve full stabilization of the Pt surface.

Comparative Example D—Fresh

A diluted Pt/Pd solution was made by adding a Pd nitrate solution into a diluted colloidal Pt solution, following the addition of an alumina binder (2.5% based on the support), 5% $SiO_2$—$Al_2O_3$ support material was added into the solution, and the mixture was milled to $D_{90}$=12-15 μm, then coated at appropriate solid content onto a honeycomb substrate. The resulting washcoat loading was 1.037 g/in³, and the Pt:Pd loading was 10 g/ft³ at 7:1 weight ratio. After drying at 110° C./4 hours, the catalyst was calcined in a box furnace in air at 450° C./1 hour.

Example 5—Degreened During Production

Using the same slurry prepared for Comparative Example D, coating the monolith and drying at 110° C./4 hours, the catalyst was calcined in a flow through tube furnace at 590° C. for 10 minutes in the presence a mixture of 10% $O_2$ and 7% $H_2O$ in balanced $N_2$. Flow rate was 12 L/min and the space velocity was 50,000/h.

Figure 8:
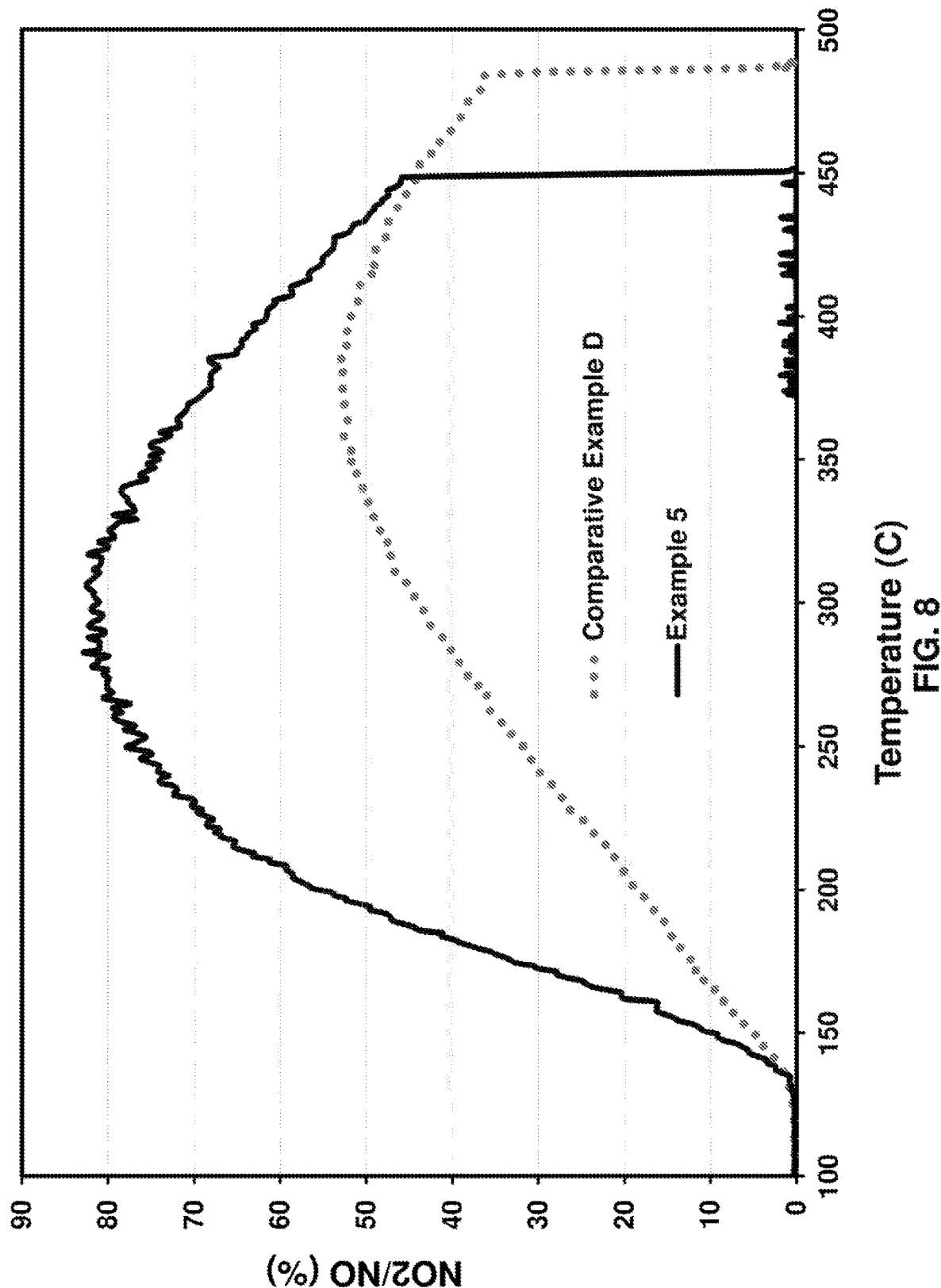
FIG. 8 provides a graph of % conversion of NO to $NO_2$ versus temperature (° C.) for comparative Pt/Pd examples and inventive embodiments.

The NO oxidation activity comparison is shown in FIG. 8. Comparative Example D, the fresh sample, represents traditional calcination in dry air at 450° C. Much higher activity was observed for Example 5, which is the Pt/Pd sample calcined at 590° C., in the presence of 7% $H_2O$. With this example, the benefit of steam calcination for degreening of NO oxidation is also demonstrated for Pt/Pd catalysts, showing that they respond to steam calcination in a manner similar to Pt-only catalysts.

Example 6.1—Degreened During Production

The catalytic material of Example 1 was coated onto a full size substrate of 10.5×10.5×6" dimension. After drying at 110° C., the catalyst was calcined in 4% $H_2O$/air at 590° C. for 30 minutes. The catalyst was then mounted onto a heavy duty diesel engine and evaluated for NO oxidation activity in the temperature range 150-450° C. The temperature ramp was achieved by continuously increasing engine load at fixed engine speed.

Example 6.2—Diesel Engine Operating Conditions

Figure 9:
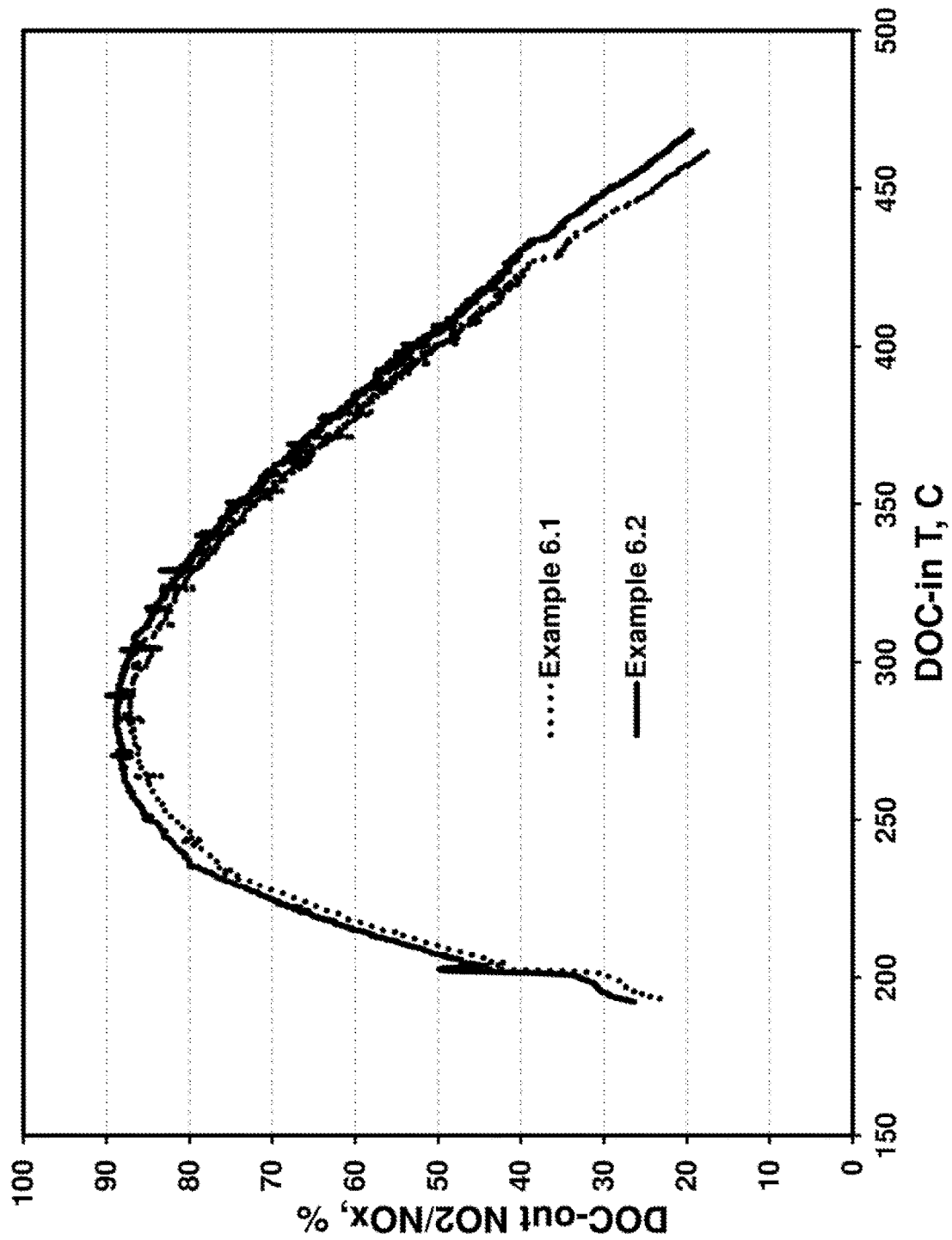
FIG. 9 provides a graph of % conversion of NO to $NO_2$ versus temperature (° C.) for Example 6.1 as treated for degreening during production and Example 6.2, which was then exposed to diesel engine operating conditions.

The catalyst of Example 6.1 was then treated at 550° C. for 30 minutes on the diesel engine to determine any change in NO oxidation activity. The catalyst of Example 6.2 was tested for NO oxidation activity and compared with the activity of Example 6.1. The results are shown in FIG. 9, where minimal change in activity was observed.

A minimal change in NO oxidation with degreening is the desired performance characteristic as exemplified by this inventive process.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A diesel oxidation catalyst composite comprising: a diesel oxidation catalytic material on a carrier, the catalytic material comprising a platinum component on a high surface area refractory metal oxide support,
   wherein the catalytic material exhibits a peak vibration frequency in the range of about 2085 to about 2105 cm$^{-1}$ as measured by CO-DRIFTS prior to exposure to operating conditions of a vehicle having a diesel engine,
   and wherein the catalyst composite is fully degreened during production of the catalytic material.

2. The diesel oxidation catalyst composite of claim 1, wherein the catalytic material has no more than about 5 wt. % of platinum oxide species found at >about 2110 cm$^{-1}$ as measured by CO-DRIFTS.

3. The diesel oxidation catalyst composite of claim 1, wherein upon exposure to continuous operation of a vehicle having a diesel engine in a range of about 200° C. to about 350° C., the catalytic material continues to exhibit a peak vibration frequency of about 2085 to about 2105 cm$^{-1}$ as measured by CO-DRIFTS.

4. The diesel oxidation catalyst composite of claim 1, wherein the platinum component is in particle form and has an average particle size in the range of about 0.5 nm to about 6 nm as measured by a CO-chemisorption method.

5. The diesel oxidation catalyst composite of claim 1, wherein the catalytic material further comprises a palladium component.

6. The diesel oxidation catalyst composite of claim 5, wherein the platinum to palladium ratio by weight is approximately 10:1 to 2:1.

7. The diesel oxidation catalyst composite of claim 1, wherein the carrier is a flow-through substrate or a wall-flow filter.

8. The diesel oxidation catalyst composite of claim 1, wherein the high surface area refractory metal oxide support comprises alumina, titania, zirconia, ceria, silica, or combinations thereof.

9. The diesel oxidation catalyst composite of claim 1, prepared according to the steps of:
   obtaining a catalytic material comprising a platinum component on a high surface area refractory metal oxide support;
   depositing the catalytic material onto a carrier to form the composite; and
   treating the catalytic material under conditions of a temperature of at least about 500° C. in the presence of humidity and oxygen to form the diesel oxidation catalyst composite.

10. A fully degreened diesel oxidation catalyst composite comprising: a diesel oxidation catalytic material on a carrier, the catalytic material comprising a platinum component on a high surface area refractory metal oxide support, wherein the catalytic material exhibits a peak vibration frequency in the range of about 2085 to about 2105 cm$^{-1}$ as measured by CO-DRIFTS prior to exposure to operating conditions of a vehicle having a diesel engine, prepared according to the steps of:
   obtaining a catalytic material comprising a platinum component on a high surface area refractory metal oxide support;
   depositing the catalytic material onto a carrier to form a diesel oxidation catalyst composite; and
   treating the diesel oxidation catalyst composite at a temperature of at least about 500° C. in the presence of humidity and oxygen during the production thereof to form the fully degreened diesel oxidation catalyst composite.

* * * * *

UNITED STATES PATENT AND TRADEMARK OFFICE
CERTIFICATE OF CORRECTION

PATENT NO. : 10,766,020 B2
APPLICATION NO. : 15/555233
DATED : September 8, 2020
INVENTOR(S) : Xinyi Wei, Stanley A. Roth and Haiyang Zhu Page 1 of 1

It is certified that error appears in the above-identified patent and that said Letters Patent is hereby corrected as shown below:

In the Specification

In Column 10, Line(s) 30, delete "Mania" and insert --titania--, therefor.

Signed and Sealed this
First Day of December, 2020

Andrei Iancu
*Director of the United States Patent and Trademark Office*